May 3, 1949.  H. T. HERBST  2,468,807
WATER COOLED GAS BLANKETED ARC WELDING TORCH
Filed May 9, 1946  2 Sheets-Sheet 1

INVENTOR
HARRY T. HERBST
BY
ATTORNEY

May 3, 1949.　　　　　H. T. HERBST　　　　　2,468,807
WATER COOLED GAS BLANKETED ARC WELDING TORCH
Filed May 9, 1946　　　　　　　　　　　　　2 Sheets-Sheet 2
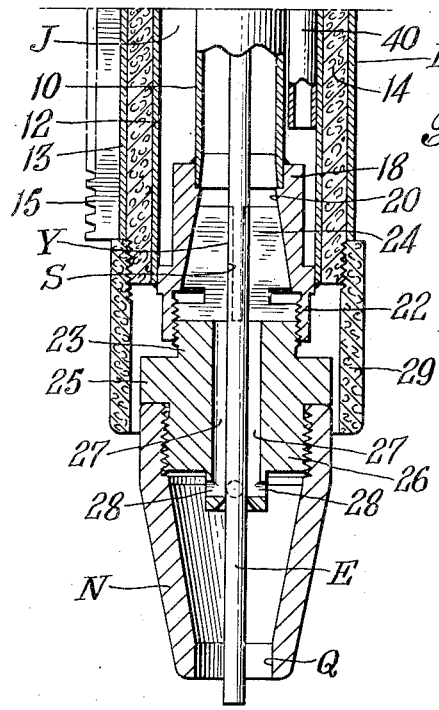
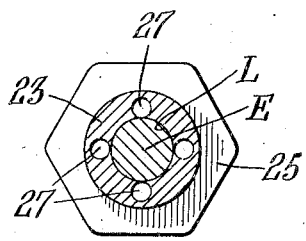
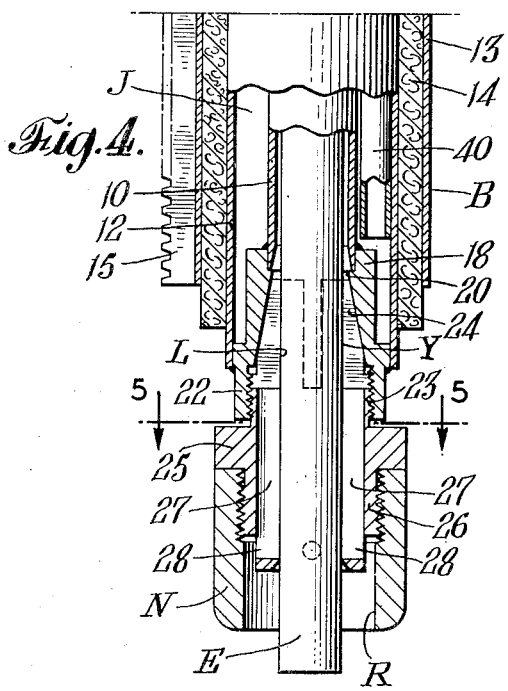
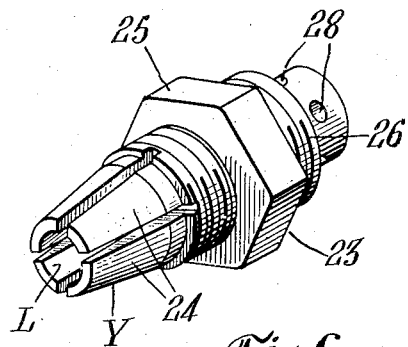
INVENTOR
HARRY T. HERBST
BY
ATTORNEY Patented May 3, 1949

2,468,807

UNITED STATES PATENT OFFICE 2,468,807

WATER-COOLED GAS BLANKETED ARC-WELDING TORCH

Harry T. Herbst, Roselle, N. J., assignor to The Linde Air Products Company, a corporation of Ohio Application May 9, 1946, Serial No. 668,517

5 Claims. (Cl. 219—15)

This invention relates to welding torches of the inert gas blanketed arc welding type, such for example as those disclosed in Meredith Patent No. 2,376,265, and more particularly to the water-cooled type disclosed in the copending application of Breymeier Serial No. 604,834 filed July 13, 1945 and my copending application Serial No. 652,924 filed March 8, 1946.

In torches of this character there has been employed an electrode of refractory material, but which tends to wear away slowly in use. The electrode has been clamped in the torch, and in order to advance the electrode to make up for the wear and maintain the desired relation with other parts of the torch, it has been necessary to stop the welding operation periodically and take the torch apart in order to unclamp and advance the electrode, and put the torch together again before resuming the welding operation.

The main object of the present invention therefore is to facilitate the advancing of the electrode and to permit such advancement during the welding operation, or without taking the torch apart, or without unclamping the electrode.

Other objects are to provide interchangeable parts to adapt the torch to receive different sizes of electrodes, and to provide a housing for enclosing the hoses for supplying respective fluids to the torch and also for enclosing the lead-in cable for supplying current to the torch.

Further objects and features of novelty will be apparent as the following description proceeds, with reference to the accompanying drawings, in which Figs. 1 and 1a together constitute a longitudinal section through a torch according to the preferred embodiment of the present invention, employing a medium-sized electrode;

Fig. 3 is a view similar to Fig. 1a, but showing the torch adapted to employ a smaller size of electrode;

Fig. 4 is a view similar to Figs. 1a and 3, but showing the adaptation for a larger size of electrode;

Fig. 5 is a transverse section taken along the line 5—5 of Fig. 4; and

Fig. 6 is a perspective view of the interchangeable electrode holder shown in Fig. 4.

The torch according to the present invention comprises in general a barrel B which forms the main body of the torch. At its front or lower end the barrel B is provided with yieldable electrode gripping means Y, which grips an electrode E firmly, but permits forced longitudinal sliding movement of the electrode therethrough. A nozzle N is also mounted at the front or lower end of the barrel B, in position to surround the front or lower end of the electrode E held by the gripping means Y. The barrel B contains a cooling jacket J disposed annularly about the electrode E, and extending longitudinally for the greater part of the length of the barrel B and the electrode E.

The rear or upper end of the barrel B is provided with a header D for supplying gas to the nozzle N, cooling medium to the jacket J, and welding current to the gripping means Y. The header D also supports the feeding means F for advancing the electrode E through the gripping means Y and the nozzle N. An insulating housing H is mounted on the header D for enclosing the supply hoses, the lead-in cable, and the feeding means F.

Figure 1:
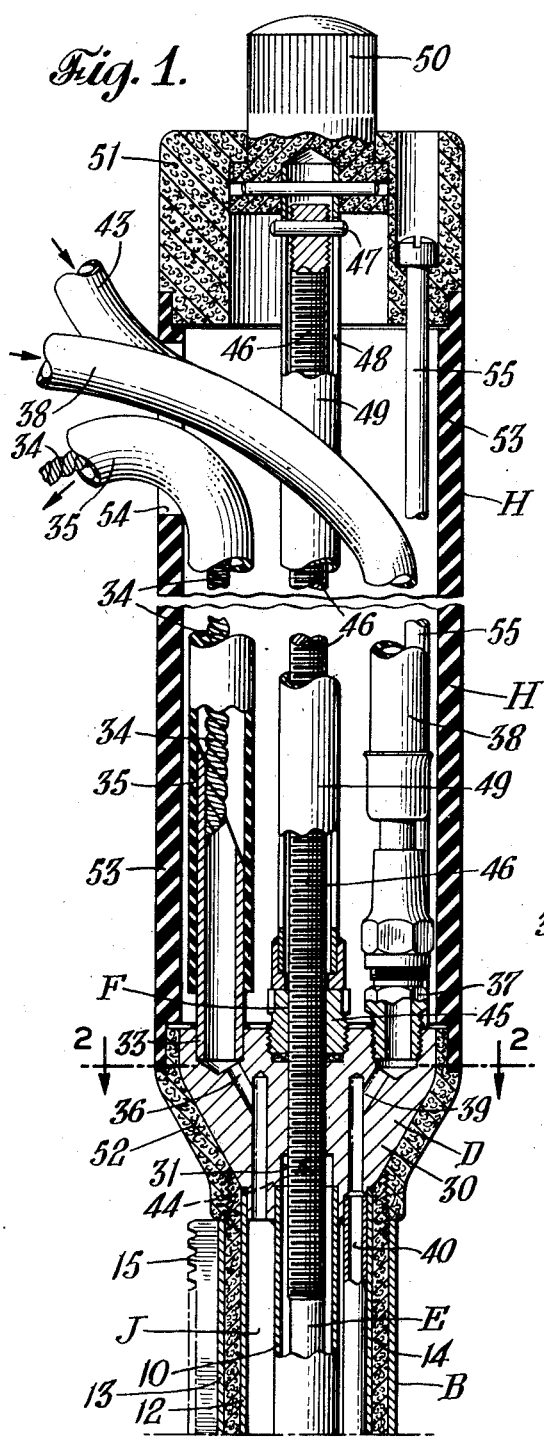
Fig. 1 is a longitudinal section through the top part of the torch.

In the form shown in Fig. 1, the barrel B comprises several tubes one inside the other, preferably in concentric relation. The innermost tube 10 forms a housing for the electrode E and also forms the inner wall of the water jacket J. An intermediate tube 12 forms the outer wall of the water jacket. The outermost tube 13 forms a protective outer shell, the space between the tubes 12 and 13 being filled with electrical insulating material 14. The outer shell 13 has rigidly secured thereto a longitudinally extending toothed rack 15, so as to fit a conventional blowpipe holder and engage the adjusting gear thereof.

At the front end of the barrel B, the tubes 10 and 12 are secured to a socket member 18. This member is fitted inside the front end of the tube 12, and has a central tapered bore forming a conical seat 20. The electrode housing tube 10 is fitted into the smaller end of the conical seat 20, so that the socket member 18 seals the front end of the water jacket J. Surrounding the larger end of the conical seat 20 is an internally threaded flange 22, the outer face of which is made polygonal to receive a wrench.

Figure 1A:
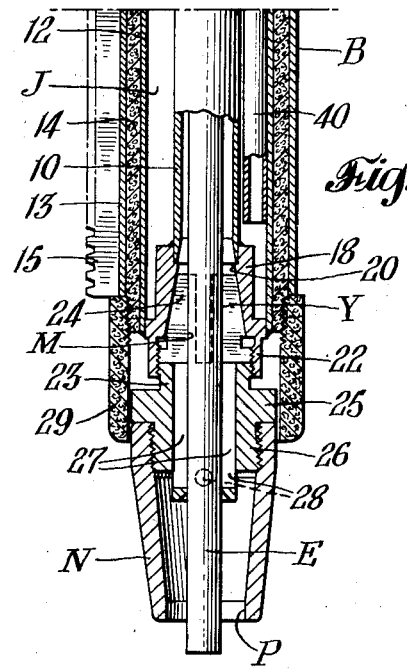
Fig. 1a is a longitudinal section through the bottom part of the torch.

The socket member 18 is adapted to receive interchangeable plugs or electrode holders 23, which have different-sized central bores for different-sized electrodes, but which are otherwise identical. The inner end of each of the interchangeable electrode holders 23 is tapered and slotted to form spring fingers 24 which engage the conical seat 20. Each electrode holder 23 has an intermediate polygonal portion 25 adapted to receive a wrench, by which it may be tightened to grip its electrode E, but permit forced sliding thereof. Each electrode holder 23 has a threaded front end 26 adapted to receive the nozzle N, which is also interchangeable to provide nozzle sizes corresponding to electrode sizes. The medium-sized electrode shown in Figs. 1 and 1a is accommodated by an electrode holder 23 having a medium-sized bore M, and the electrode holder receives a nozzle having a medium-sized orifice P. The smaller electrode shown in Fig. 3 is received by an electrode holder 23 having a smaller bore S, and a nozzle having a smaller orifice Q. The larger electrode of Fig. 4 is received in a correspondingly larger bore L in the electrode holder 23, and a nozzle having a larger orifice R. The bores of the electrode holders 23 also have longitudinal grooves 27 communicating at their inner ends with the slots between the spring fingers 24, and at their outer ends with radial drillings 28 communicating with the interior of the nozzle N. To extend the outer insulation of the torch over the electrode holder 23, a rigid sleeve 29 of similar insulating material is secured for example by screw threads to the lower end of the insulating material 14.

Figure 2:
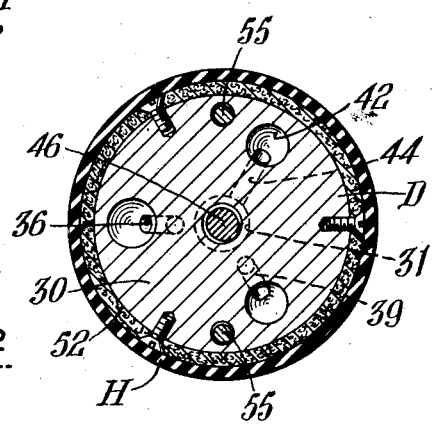
Fig. 2 is a transverse section taken along the line 2—2 of Fig. 1.

The rear end of the barrel B is secured to the header D which comprises a block or fitting 30 which has its smaller end fitted inside the shell 14. This block 30 has a central bore 31 into which the electrode housing tube 10 is secured, so as to seal the rear end of the water jacket J. The fitting 30 is enlarged at its upper end to provide space for three eccentric bores as shown in Fig. 2.

One of the eccentric bores has welded or soldered therein a tube 33, to the inside of which is soldered or brazed the lead-in cable 34, and over the outside of which is fitted the cooling medium outlet hose 35, so as to communicate through suitable drillings 36 in the block 30 with the interior of the water jacket.

The water inlet is provided by a coupling 37 threaded into another eccentric bore, and connected to the water inlet hose 38. The coupling 37 communicates through suitable drillings 39 in the block 30 with the water inlet tube 40, which extends through the water jacket to discharge at the front end thereof as shown in Fig. 1a.

The third eccentric bore 42 receives a coupling for the inert gas inlet hose 43. The coupling communicates through suitable drillings 44 with the central bore 31 which receives the electrode housing tube 10.

The top of the central bore in the block 30 receives a nut 45 through which a feed screw 46 extends down through the bore into the electrode housing tube 10 to engage the top of the electrode E. The upper end of the feed screw 46 has a transverse pin 47 engaging a longitudinal slot 48 in a drive sleeve 49 rigidly secured to an operating knob 50 journaled in an insulated cap 51. The lower end of the drive sleeve 49 is journaled on top of the nut 45.

The block 30 has a shell 52 of insulating material threaded onto the insulation 14 of the barrel B. The larger upper rim of the shell 52 receives one end of a tubular shield 53 of rigid insulating material provided with an outlet aperture 54 for the three hoses 35, 38, and 43. The upper end of the shield 53 receives the cap 51 which is of similar insulating material, the parts being removably held together by a long screw 55 having a head in the cup 51 and passing through the inside of the shield 53 and threaded into the block 30.

In setting up the torch for operation, the operating knob 50 is turned to retract the feed screw 46 to bring the pin 47 to the top of the slot 48. The plug 23 is selected according to the size of the electrode being used, and a corresponding size of nozzle N is selected so as to provide the proper dimension for the annular throat between the nozzle and the electrode. The selected electrode is inserted through the plug 23 into the electrode housing tube 10 until it abuts the lower end of the feed screw 46. The plug 23 is then tightened quite firmly but still loose enough to permit the electrode to be advanced by the feed screw.

The electrode being installed, and the outer shell 13 and the rack 15 being mounted in a blowpipe holder on a suitable propelling machine therefor, the water inlet hose 38 is connected to a suitable supply of clean water under pressure, the water outlet hose 35 is directed to a drain, the lead-in cable 34 is connected to a suitable source of electric welding current, and the inert gas hose 43 is connected to a source of helium, argon or other inert gas under pressure.

In operation, the shell 13 is advanced toward the work by the adjusting knob on the blowpipe holder, which turns a pinion meshing with the toothed rack 15, until an arc is struck between the electrode E and the work. The propelling machine is operated at welding speed to advance the torch along the desired line of weld. The electric welding current from the lead-in cable 34 passes through the coupling 33 to the block 30 from which it passes through the electrode housing tube 10, the outer tube 12 and the water jacket J therebetween, to the front socket member 18 and the plug 23 to the electrode and so through the arc to the work.

The inert gas from the hose 43 passes through the bore 42 and drillings 44 in the block 30 to the central bore 31, and through the space within the tube 10 outside of the electrode to the conical seat 20. From the conical seat 20 the inert gas passes between the spring fingers 24 and through grooves 27 and drillings 28 to the interior of the nozzle N from which it flows out in an annular stream about the arc.

The cooling water from the hose 38 passes through coupling 37 and the drillings 39 in the block 30 to the water inlet tube 40 which discharges at the front end of the water jacket and circulates back through the jacket to the drillings 36 in the fitting 30 to the coupling 33, and thence around the lead-in cable 34 out through the hose 35 to the drain.

When the electrode has worn away, the knob 50 is turned, even without stopping the propelling machine, to turn the sleeve 49 which through the pin 47 in its slot 48 turns the screw 46 in the nut 45 and thus advances the electrode to make up for the wear. As the electrode descends, the pin 47 descends in the slot 48 which permits the knob 50 to continue projecting outside of the cup 51, instead of advancing with the screw. This avoids the knob or feed screw projecting outside the torch when a fresh long electrode is employed.

While this embodiment of the invention has been described in detail, it is to be understood that the invention is not to be limited to these precise details, but instead the invention embraces such modifications of the broad idea as fall within the scope of the appended claims.

What is claimed is:

1. In a gas blanketed arc welding torch, an electrically conductive housing tube for an electrode, electrically conductive electrode contacting means mounted on said tube, a nozzle mounted on said contacting means and extending therebeyond toward the arc to form with the electrode an annular gas passage terminating in an annular orifice, a rigid annular wall outside of and concentric with said tube and forming therewith an annular cooling chamber, said torch having a passage extending from said tube through said contacting means and inside said annular cooling chamber and into said nozzle means near its mounting on said contacting means whereby gas supplied to said tube passes along said annular gas passage and along said electrode and out through said annular orifice and means for feeding said electrode through the gas in said housing tube, through said rigid walled annular cooling chamber, through said contacting means, and out through said nozzle.

2. In a gas blanketed arc welding torch as claimed in claim 1, an electrically insulated outer shell secured at one end to said contacting means, and means operable from the opposite end of said shell for actuating said electrode feeding means.

3. In a gas blanketed arc welding torch, an electrically conductive housing tube for an electrode, electrically conductive electrode contacting means mounted on said tube, a nozzle mounted on said electrode contacting means and extending therebeyond toward the arc to form with the electrode an annular gas passage terminating in an annular orifice, a rigid annular wall outside of and concentric with said tube and forming therewith an annular cooling chamber, a nut closing the end of said tube away from the arc, a screw passing through said nut and engaging said electrode, said tube having an entrance below said nut for receiving gas to pass along the electrode past the contacting means inside said cooling chamber into said nozzle near its mounting on said contacting means to pass along said annular gas passage and out through said annular orifice, and means for turning said screw for feeding the electrode through the gas in said housing tube and nozzle.

4. In a gas blanketed arc welding torch as claimed in claim 1, a socket member fitting inside said annular cooling chamber wall and secured thereto, said socket member having a conical seat therein with its smaller end secured to said electrode housing tube thereby forming an annular bottom for said annular cooling chamber, and a hollow threaded plug screwed into said socket member and having spring fingers entering the larger end of said conical seat and converging away from the arc.

5. In a gas blanketed arc welding torch as claimed in claim 1, in which the torch is adapted to receive electrodes of different sizes, and said contacting means comprises a socket removably receiving a selected one of a series of interchangeable parts adapted to receive different sizes of electrodes, and said nozzle is removably mounted on the interchangeable part and is a correspondingly selected one of a series having orifices of different sizes adapted to cooperate with corresponding sizes of electrodes to provide a corresponding size of annular throat therearound.

HARRY T. HERBST.

REFERENCES CITED

The following references are of record in the file of this patent:

UNITED STATES PATENTS

| Number | Name | Date |
|---|---|---|
| 1,553,543 | Lincoln | Sept. 15, 1925 |
| 1,869,328 | Tobey | July 26, 1932 |
| 1,946,305 | Catlett | Feb. 6, 1934 |
| 2,063,467 | Southgate | Dec. 8, 1936 |
| 2,314,628 | Pavlecka | Mar. 23, 1943 |
| 2,376,265 | Meredith | May 15, 1945 |
| 2,400,285 | Buck | May 14, 1946 |